United States Patent [19]
Hayashi et al.

[11] Patent Number: 6,120,927
[45] Date of Patent: Sep. 19, 2000

[54] METHOD OF RECOVERING LITHIUM FROM BATTERIES

[75] Inventors: Masaru Hayashi; Motonaka Yabuki; Masayuki Onuma; Fuminobu Tezuka, all of Kanagawa; Yuki Tomioka, Saitama, all of Japan

[73] Assignee: Kabushiki Kaisha Toshiba, Kawasaki, Japan

[21] Appl. No.: 09/270,683

[22] Filed: Mar. 16, 1999

[30] Foreign Application Priority Data

Mar. 17, 1998 [JP] Japan .................................. 10-067288

[51] Int. Cl.[7] .................................................. H01M 10/54
[52] U.S. Cl. ...................... 429/49; 429/231.1; 423/179.5
[58] Field of Search .................... 429/49, 231.1, 429/231.2, 231.3; 423/179.5, 441, 50

[56] References Cited

U.S. PATENT DOCUMENTS

| | | |
|---|---|---|
| 3,793,433 | 2/1974 | Seeley et al. . |
| 4,274,834 | 6/1981 | Brown et al. .......................... 23/302 R |
| 4,637,928 | 1/1987 | Zajac, Jr. et al. ........................ 423/659 |
| 5,352,270 | 10/1994 | Shackle ...................................... 75/419 |
| 5,491,037 | 2/1996 | Kawakami .................................. 429/49 |
| 5,888,463 | 5/1999 | McLaughlin et al. ................ 423/179.5 |

FOREIGN PATENT DOCUMENTS

| | | |
|---|---|---|
| 6-251805 | 9/1994 | Japan . |
| 6-322452 | 11/1994 | Japan . |

*Primary Examiner*—Carol Chaney
*Attorney, Agent, or Firm*—Oblon, Spivak, McClelland, Maier & Neustadt, P.C.

[57] ABSTRACT

Disclosed is a method of recovering lithium from a battery containing lithium such as a lithium ion secondary battery. The lithium-containing member of the battery is dissolved with an acidic liquid, and an alkaline material is added to the obtained lithium solution to transform a transition metal which may be dissolved in the lithium solution into a metal hydroxide precipitation, whereby the metal hydroxide precipitate is separated from the lithium solution. The lithium solution is then dried to obtain a solid containing the lithium, and the lithium is eluted from the solid with a non-aqueous solvent. Retrieving lithium from the lithium eluate is accomplished by use of a cation exchanger.

20 Claims, No Drawings

METHOD OF RECOVERING LITHIUM FROM BATTERIES

BACKGROUND OF THE INVENTION

1. Field of the Invention

The present invention relates to a method of recovering lithium from batteries by separating lithium contained in the lithium-containing member such as an cathodic active material of a lithium ion secondary battery which is used as a power source for various electronics such as VTRs and communication tools.

2. Related Art

Nonaqueous electrolytic batteries attract considerable attention as the battery with a high energy density and have come to be widely used as the power source for electronics along with the recent progress of a variety of down-sized and light-weight electronics such as VTRs, communication tools and the like. Among these nonaqueous electrolytic batteries, lithium ion secondary batteries, unlike other secondary batteries, do not contain the metal components of which use must be carefully considered from the standpoint of environmental problems, such as mercury, cadmium and lead, and are also characterized by having a sufficient cycle life. Hence the usage of the lithium ion secondary batteries is steadily increasing.

As for materials used for the lithium ion secondary batteries, both of materials currently used and materials proposed for the next generation contain rare metals such as cobalt and the like, which are specified as the national stock material. Hence public attention is focused on the recovery of rare metals from used lithium ion secondary batteries to reuse these metals.

As the process for separation and recovery of lithium from cathodic active materials of the lithium ion secondary batteries, there is a conventional process in which the batteries are calcined and crushed, the crushed batteries are dissolved in an acid after iron is removed from the crushed batteries by means of magnetic separation, the pH of the solution is adjusted and then sodium carbonate is added to the solution to precipitate the lithium element as lithium carbonate, thereby separating and recovering the lithium element from the solution. This process for the recovery of lithium can yield a recovery product of lithium of relatively high purity.

This process, however, can be applied only to the batteries using a specific lithium oxide as the cathodic active material and only exhibits a low recovery yield.

Another recovery processes include steps of separating only cathodic materials from the batteries, removing substrate aluminum from the anodic materials, and subsequently crushing the remaining cathodic active material for reuse. In this case, however, the cathodic active material contains many other components and the composition of the cathodic active material has changed by use. Therefore, the removal of impurities and the adjustment of the components are necessary, resulting in the problem of raising the total cost.

SUMMARY OF THE INVENTION

With these problems in mind, therefore, it is the primary object of the present invention to provide a novel method of recovering lithium from batteries, that is, a recovering method which enables to recover lithium from used lithium ion secondary batteries in a high yield at low costs and to recover products of high purity.

In order to achive the above-mentioned object, a method of recovering lithium from a lithium ion secondary battery having an cathodic active material containing lithium according to the present invention comprises: the steps of: dissolving the cathodic active material into mineral acid to obtain an acid solution containing lithium; adding an alkaline material to the acid solution to obtain a resultant solution; drying the resultant solution to produce a dried solid; dissolving the dried solid into a non-aqueous solvent to obtain a non-aqueous solution; and separating lithium from the non-aqueous solution.

In another aspect of the present invention, a method of recovering lithium from a battery having a member containing lithium according to the present invention comprises the steps of: dissolving the lithium of said member with an acidic liquid to obtain a lithium solution; adding an alkaline material to the lithium solution to transform a transition metal which may be dissolved in the lithium solution into a metal hydroxide precipitation, whereby the metal hydroxide precipitation is separated from the lithium solution; drying the lithium solution after the adding step to obtain a solid containing the lithium: eluting the lithium from the solid with a non-aqueous solvent having eluting ability for lithium to obtain a lithium eluate; and retrieving the lithium from the lithium eluate.

Moreover, in another aspect of the present invention, a method of recovering lithium from a battery having a member containing lithium according to the present invention comprises the steps of: dissolving the lithium of said member with an acidic liquid to obtain a lithium solution; adding an alkaline material to the lithium solution; removing, if a precipitation is produced in the lithium solution at the adding step, said precipitation from the lithium solution; drying the lithium solution after the removing step to obtain a solid containing the lithium: eluting the lithium from the solid with a non-aqueous solvent having eluting ability for lithium to obtain a lithium eluate; and retrieving the lithium from the lithium eluate.

The features and advantages of the recovering method according to the present invention over the proposed recovering process will be more clearly understood from the following description of the preferred embodiments of the present invention.

DETAILED DESCRIPTION OF THE PREFERRED EMBODIMENTS

Now, the present invention will be described below in detail.

Batteries, including galvanic cells and battery packs, have, in general, positive and negative electrodes, an electrolyte and a casing for covering these parts. Each of the electrodes comprises a collector which is a main body of the electrode and a layer of an anodic or cathodic active material which is formed on the surface of the collector. The anodic and cathodic active materials are respectively laminated as a film on the surface of each of the collectors by using a binder such as a PVdF, and they work for an exchange of electrons and ions on the surface of the collector. These active materials also serve to protect the surface of the collector. The batteries containing lithium includes various types of batteries, and a lithium ion secondary battery is one of them. In the lithium ion secondary battery, the cathodic collector is commonly formed of aluminum and the anodic collector is formed of copper. As the cathodic active material, $LiCoO_2$, $LiNiO_2$ or the like is used, and carbon or the like is used as the anodic active material. Accordingly, lithium is recovered in this case from the cathodic active material provided on the electrode of the battery or the battery pack, for instance, a used lithium ion secondary battery or a used lihtium ion secondary battery pack. In the present invention, any material containing lithium can, however, be used as a resource of the lithium recovery without limitation, and electrodes and electrolytes of various types of primary and secondary batteries may be the resource of lithium as well. Illustrated examples of batteries include primary batteries of lithium-carbon fluoride type, lithium-manganese dioxide type, solid lithium type and the like and secondary batteries of organic electrolyte type, polymer electrolyte type and the like.

Here, a method of recovering lithium from the cathodic active material of a used lithium ion secondary battery will be described below as a typical example the present invention.

In the recovering method, first, the resource of lithium or the cathodic active material which is separated from the used battery is immersed in an acid liquid to dissolve lithium, thereby preparing a lithium-containing liquid or a lithium solution. In this time, if the cathodic active material of the lithium ion secondary battery is composed of $LiCoO_2$, lithium and cobalt are dissolved and ionized by immersing the cathodic material in the acid liquid. As the acid liquid for dissolving lithium of the cathodic active material, an aqueous solution of a mineral acid such as hydrochloric acid, sulfuric acid, nitric acid and the like can be suitably used. However, the acid liquid is not limited to these acid solutions and any aqueous solution of an acid capable of dissolving metals may be used. It is unfavorable that the other battery parts such as an cathodic collector and an anode are mixed with the cathodic active material, since a large amount of other metal elements than lithium which are the constituents of those battery parts are also dissolved in the acid liquid. It is hence desired to remove, in advance, unnecessary parts containing other metal element from the cathodic material as much as possible.

Next, an aqueous alkali solution is added to the acid liquid dissolving lithium to adjust the pH value of the mixed liquid containing lithium to a range from neutral to basic. This treatment enables transition metals, e.g., cobalt, to precipitate in the form of hydroxide. Hence the transition metals such as cobalt can be removed from the mixture containing lithium by filtration of the solution. In a case of various metal elements being contained in the lithium-dissolving acid liquid, if the lithium-dissolving liquid is neutralized to pH 7, the metal elements such as iron, chromium, aluminium and the like are first precipitated, and, if it is further alkalized with more alkali solution so that the pH value is in the range of about 10 or more, cobalt is then precipitated.

Here, any particular limitation should not be imposed on the alkaline matter allowed to be used for the aqueous alkali solution, and various alkaline matters such as metal hydroxide, ammonia, organic alkaline matters and the like are usable. However, it is desirable to use sodium hydroxide or potassium hydroxide in consideration of the fact that these materials are inexpensive and can precipitate transition metals efficiently. If ammonia water is used as the aqueous alkali solution, the efficiency in removal of transition metals tends to fall. However, use of ammonia does not increase the content of other metal elements in the lithium recovery system or the lithium solution. Therefore, it depends on the requirement to the recovered lithium product if ammonia is used for neutralization in this step or not.

Then water of the lithium-containing aqueous mixture after the filtration is evaporated and the residue is dried to obtain a solid product containing a lithium salt and salts of other metals than lithium. The solid product is brought into contact with nonaqueous solvent which can dissolve lithium, to elute lithium from the solid product. Given as examples of the nonaqueous solvent capable of dissolving lithium are aliphatic and aromatic alcoholic solvents, ketone solvents and the like. Among these solvents, alcoholic solvents, particularly, aliphatic alcoholic solvents are preferred. When an alkali metal is dissolved in an alcoholic solvent, an alcoholate is produced. To the alcoholic solvent, the solubility of lithium is higher than those of other alkali metals and hence lithium is selectively dissolved in the alcoholic solvent. Accordingly, if the solid product is immersed in the alcoholic solvent, almost all lithium can be eluted by the alcohol, and at the same time, it is also possible to extract and separate lithium from other alkali metals than lithium. Specific examples of the alcoholic solvent for extracting lithium include monohydric aliphatic alcohols such as methanol, ethanol, propanol and the like; polyhydric aliphatic alcohols such as ethylene glycol, glycerol and the like; and aromatic alcohols such as benzyl alcohol and the like. Among these alcohols, methanol, ethanol, 1-propanol and 2-propanol are preferable in view of the capability of dissolving lithium, the cost and the handling at ease, and in particular, methanol is most suitable of these alcohols.

The elution or extraction of lithium using an alcoholic solvent makes use of the feature of lithium that the solubility of lithium in the alcohol is higher than those of other alkali metals. Hence, if the solid product of alkali metal salts is insufficiently dried so that a large amount of water remains in the solid product, alkali metals other than lithium dissolve in water and get mixed in the nonaqueous solvent. As a result, the contents of alkali metals in the nonaqueous solvent are also increased, resulting in a fall of the separation ability of lithium salt from other alkali salts. From the reason mentioned above, it is desired to remove water sufficiently from the solid product of alkali metal salts. Practically, it is preferable to dry so that the amount of water in 100 g of the solid product of alkali metal salts be 5 ml or less. Even when a nonaqueous solvent other than alcohol is used as the eluent, it is likewise desirable to remove water sufficiently from the solid product of alkali metal salts.

The remaining solid product being not eluted is removed by separation such as filtration, etc. of the eluate dissolving lithium to obtain a solution containing lithium. The use of, particularly, alcohol as the eluent makes it possible to obtain a lithium extract or a lithium-containing eluate in which the content of other alkali metal elements than lithium is less.

The filtered eluate is subjected to adjustment of pH value so that it is made weakly acidic by addition of an acid matter, e.g., hydrochloric acid, etc. The eluate is then brought into contact with an cation exchange resin, whereby alkali metals other than lithium, namely, sodium and potassium are adsorbed to the cation exchange resin. As a result, the alkali metals such as sodium contained in a small amount in the eluate are removed and a solution which contains lithium of high purity can be thus obtained. Accordingly, if the solvent of the extract after treated by the cation exchange resin is evaporated, lithium of high purity can be recovered as lithium chloride or as a salt of other acid at a high recovery yield. If the eluate contains transition metals such as cobalt and the like, those are also adsorbed by the cation exchange resin.

Use of alcohol as the medium in the cation exchanging treatment is also effective for selectively adsorbing and removing the other alkali metals than lithium. However, if the concentration of the eluting solvent falls by addition of water or the like, the purity of lithium recovered through the cation exchanging treatment is reduced and alkali metals other than lithium contaminate the recovered lithium product. Therefore, it is preferred, when the pH value of the eluate is adjusted with the acid matter, the concentration of the eluting solvent in the eluate is not reduced very much by addition of the acid matter. For this purpose, it is possible to use, as the acid matter, a mixture of aqueous solution of highly concentrated acid matter and alcohol, or bubbling of gaseous acid matter.

In the lithium recovery process described above, if the lithium solution obtained by dissolving the active material does not contain alkali metals other than lithium, and if the alkaline matter added to the lithium solution for precipitating transition metals is ammonia water, lithium in the eluate with alcohol has a purity of 90% by weight or more, and it may contain a transition metal which originates from the active material but no alkali metals. Therefore, the content of the eluate before the cation exchanging treatment can be used for preparation of the active material of batteries.

EXAMPLES

The present invention will be hereinafter explained by way of examples.

Example 1-1

The electrodes were taken out from used lithium ion secondary batteries using lithium cobaltate ($LiCoO_2$) as the cathodic active material and they were separated into the cathodic material, the anodic material and the separator. Then the cathodic active material was peeled off from the cathodic material to collect 1 kg of cathodic active material, which was dissolved into hydrochloric acid. The hydrochloric acid solution was filtered to remove carbon powder contained in the cathodic active material. To the resulting hydrochloric acid solution was added 20% sodium hydroxide aqueous solution to adjust the solution to pH 10, whereby a precipitate was produced. The precipitate was then removed by filtration, which contained cobalt hydroxide. Each content (% by weight) of cobalt, sodium and lithium in the filtrate was measured by using inductively coupled argon plasma emission spectrometry.

The above filtrate was poured into a glass beaker, which was then heated on a hot plate until water was completely removed to obtain a powdery solid. The solid was allowed to stand for cooling and 200 ml of methanol was added as an eluent to the cooled solid, followed by stirring sufficiently. The mixture of methanol and the powdery solid was filtered using filter paper and the powdery solid was removed to obtain a methanol extract. Then each content (% by weight) of cobalt, sodium and lithium in the methanol extract after the filtration was measured. Moreover, 4 ml of 12 N hydrochloric acid was then added to the methanol extract.

Into a polypropylene column filled was 100 ml (volume when swelled in water) of a cation exchange resin. The cation exchange resin was washed with a mixed solution of 50 ml of methanol and 1 ml of 12 N hydrochloric acid. The methanol extract obtained above was passed through the column filled with the cation exchange resin to collect the effluent. Further, 100 ml of a mixed solution of methanol and hydrochloric acid having the same composition as that used for the washing was divided into five portions which were sequentially flowed through the same column to collect the effluent. These effluents collected were combined and placed in a distilling flask made of glass, followed by distilling to remove methanol perfectly thereby recovering 380 g of a solid containing lithium in the form of lithium chloride.

Each content (% by weight) of cobalt, sodium and lithium in the solid recovered by the above process was measured. The result of measurement is shown in Table 1 together with the results of above-mentioned measurement for the precipitate-removed solution and methanol extract.

TABLE 1

CONTENT OF COBALT, SODIUM AND LITHIUM AND RECOVERY

| Example 1-1 | CONTENT (% by weight) | | | Recovery (% by weight) |
| --- | --- | --- | --- | --- |
| | Co | Na | Li | |
| Precipitate-Removed Solution | 0.05 | 86.76 | 13.19 | — |
| Methanol Extract | 0.04 | 34.49 | 65.47 | — |
| Recovered Lithium Chloride | <0.01 | 0.01 | 99.89 | 98.7 |

The recovery yield of lithium in the above operation was 98.7% by weight.

It is understood from the results of measurement that cobalt is efficiently removed by using an alkali agent with production of precipitate. Also, the powdery solid obtained by removing water from the precipitate-removed solution is composed of chloride of lithium and sodium. When the chloride is extracted by methanol, lithium is dissolved in methanol in the form of a lithium alcoholate and most of sodium remains as sodium chloride in the form of powder. It is clear that the selectivity in methanol for dissolution of lithium is considerably high and hence a combination of a process of dissolving lithium with use of alcohol and a treatment with a cation exchange resin ensures a production of lithium having extremely high purity.

Examples 1-2 and 1-3

Lithium chloride was recovered from used lithium ion secondary batteries in the same manner as in Example 1 except that the mixing ratio and concentration of hydrochloric acid were adjusted such that the concentrations of methanol both in the methanol extract which was passed though the column in the process using a cation exchange resin and in the mixed solution of methanol and hydrochloric acid were 30% (Example 1-2) and 20% (Example 1-3), respectively.

The contents of sodium in the recovered products were 2.15% (Example 1-2) and 3.45% (Example 1-3), respectively, and the contents of lithium in the recovered products were 97.8% (Example 1-2) and 96.5% (Example 1-3), respectively.

These results show that, as the concentration of methanol in the treatment process using a cation exchange resin is reduced, alkali metals, other than lithium, which contaminate the recovered product increase and hence the purity of the recovered lithium falls.

Example 2

The operation of Example 1-1 was repeated, excepting that, instead of the sodium hydroxide solution, a potassium hydroxide solution was used as the alkali agent to be added to precipitate cobalt. As a result, 376 g of a solid containing lithium chloride was recovered from used lithium ion secondary batteries. In this operation, each content (% by weight) of cobalt, potassium and lithium contained in each of the precipitate-removed solution which was separated from cobalt hydroxide by precipitation, the methanol extract and the recovered product after the treatment using a cation exchange resin was measured. The results are shown in Table 2.

TABLE 2

CONTENT OF COBALT, SODIUM AND LITHIUM AND RECOVERY

| Example 2 | CONTENT (% by weight) | | | Recovery (% by weight) |
|---|---|---|---|---|
| | Co | K | Li | |
| Precipitate-Removed Solution | 0.05 | 87.76 | 12.19 | — |
| Methanol Extract | 0.04 | 34.79 | 65.17 | — |
| Recovered Lithium Chloride | <0.01 | 0.08 | 99.92 | 98.5 |

Example 3

The operation of the Example 1-1 was repeated, excepting that, instead of the sodium hydroxide solution, aqueous ammonia was used as the alkali agent added to precipitate cobalt, and that the pH was adjusted to 9. As a result, 364 g of a solid containing lithium chloride was recovered from used lithium ion secondary batteries. In this operation, each content (% by weight) of cobalt, ammonia and lithium contained in each of the precipitate-removed solution which was separated from cobalt hydroxide by precipitation, the methanol extract and the recovered product after the treatment using a cation exchange resin was measured. The results are shown in Table 3.

TABLE 3

CONTENT OF COBALT, SODIUM AND LITHIUM AND RECOVERY

| Example 3 | CONTENT (% by weight) | | | Recovery (% by weight) |
|---|---|---|---|---|
| | Co | NH$_3$ | Li | |
| Precipitate-Removed Solution | 7.85 | 82.15 | 10.00 | — |
| Methanol Extract | 7.65 | 0.50 | 91.85 | — |
| Recovered Lithium Chloride | 0.20 | 0.01 | 99.79 | 98.1 |

Example 4

The operation of Example 1-1 was repeated, excepting that, as the used batteries from which lithium was recovered, those using lithium nickelate as the cathodic active material were used. As a result, 384 g of a solid containing lithium chloride was recovered. In this operation, each content (% by weight) of nickel, sodium and lithium contained in each of the precipitate-removed solution which was separated from cobalt hydroxide by precipitation, the methanol extract and the recovered product after the treatment using a cation exchange resin was measured. The results are shown in Table 4.

TABLE 4

CONTENT OF NICKEL, SODIUM AND LITHIUM AND RECOVERY

| Example 1-1 | CONTENT (% by weight) | | | Recovery (% by weight) |
|---|---|---|---|---|
| | Ni | Na | Li | |
| Precipitate-Removed Solution | 0.10 | 87.30 | 12.60 | — |
| Methanol Extract | 0.04 | 35.49 | 64.47 | — |
| Recovered Lithium Chloride | <0.01 | 0.13 | 99.87 | 97.8 |

As mentioned above, in the process for recovering lithium from batteries according to the present invention, transition metals are removed from the solution containing cathodic active materials of lithium ion secondary batteries to obtain a solution containing alkali metals. The solution is then subjected to evaporation to dryness to form a solid, and the extract obtained by extracting lithium from the resulting solid is brought into contact with a cation exchange resin, thereby obtaining a solution containing lithium in a high purity and a high yield. Therefore, it is possible to separate lithium from the cathodic active materials of the used lithium ion secondary batteries very easily at low costs in a high yield. The recovered product has high purity according to the present invention.

It must be understood that the invention is in no way limited to the above embodiments and that many changes may be brought about therein without departing from the scope of the invention as defined by the appended claims.

What is claimed is:

1. A method of recovering lithium from a lithium ion secondary battery having a cathodic active material containing lithium, comprising the steps of:

dissolving the cathodic active material into mineral acid to obtain an acid solution containing lithium;

adding an alkaline material to the acid solution to obtain a resultant solution;

drying the resultant solution to produce a dried solid;

dissolving the dried solid into a non-aqueous solvent to obtain a non-aqueous solution; and recovering lithium from the non-aqueous solution.

2. The recovering method of claim 1, wherein the separating step comprises:

contacting the non-aqueous solution with a cation exchanger to adsorb other alkaline ion than the lithium ion and separate lithium from said other alkaline ion.

3. The recovering method of claim 1, wherein the non-aqueous solvent includes one selected from the group consisting of alcohol and ketone.

4. The recovering method of claim 1, wherein the non-aqueous solvent is at least one selected from the group consisting of methanol, ethanol, 1-propanol, 2-propanol, ethylene glycol, glycerol and benzyl alcohol.

5. The recovering method of claim 2, wherein the separating step further comprises:

adjusting the non-aqueous solution, before the contacting step, in an acidic state.

6. The recovering method of claim 1, wherein the anodic active material is composed of LiCoO$_2$ or LiNiO$_2$.

7. The recovering method of claim 1, wherein, if the acid solution containing lithium at the adding step produces a precipitation by the alkaline material, the adding step comprises:

removing the precipitation from the resultant solution.

8. The recovering method of claim 7, wherein the precipitation includes a transition metal hydroxide.

9. The recovering method of claim 1, wherein the pH value of the resultant solution at the adding step is adjusted to approximately 10 or more.

10. A method of recovering lithium from a battery having a member containing lithium, comprising the steps of:
dissolving the lithium of said member with an acidic liquid to obtain a lithium solution;
adding an alkaline material to the lithium solution to transform a transition metal which may be dissolved in the lithium solution into a metal hydroxide precipitation, whereby the metal hydroxide precipitation is separated from the lithium solution;
drying the lithium solution after the adding step to obtain a solid containing the lithium:
eluting the lithium from the solid with a non-aqueous solvent to obtain a lithium eluate; and
retrieving the lithium from the lithium eluate.

11. A method of recovering lithium from a battery having a member containing lithium, comprising the steps of:
dissolving the lithium of said member with an acidic liquid to obtain a lithium solution;
adding an alkaline material to the lithium solution;
removing, if a precipitation is produced in the lithium solution at the adding step, said precipitation from the lithium solution;
drying the lithium solution after the removing step to obtain a solid containing the lithium:
eluting the lithium from the solid with a non-aqueous solvent to obtain a lithium eluate; and
retrieving the lithium from the lithium eluate.

12. The recovering method of claim 11, wherein, if the lithium solution contains a transition metal, said transition metal is transformed into a metal hydroxide precipitation by the alkaline material at the adding step.

13. The recovering method of claim 11, wherein the retrieving step comprises:
adjusting the lithium eluate in an acidic state by addition of an acid material; and
contacting the lithium eluate with a cation exchanger for adsorbing metal other than lithium.

14. The recovering method of claim 11, wherein the acidic liquid of the dissolving step is an aqueous solution of mineral acid.

15. The recovering method of claim 11, wherein the alkaline material of the adding step includes an aqueous solution of metallic hydroxide.

16. The recovering method of claim 15, wherein the metallic hydroxide is alkaline metal hydroxide selected from the group consisting of sodium hydroxide and potassium hydroxide, and the pH value of the lithium solution at the adding step is adjusted to approximately 10 or more.

17. The recovering method of claim 11, wherein the alkaline material of the adding step includes ammonium hydroxide.

18. The recovering method of claim 11, wherein the non-aqueous solvent of the eluting step includes one selected from the group consisting of alcohol and keton.

19. The recovering method of claim 11, wherein the non-aqueous solvent of the eluting step is alcohol selected from the group consisting of methanol, ethanol, 1-propanol, 2-propanol, ethylene glycol, glycerol and benzyl alcohol.

20. The recovering method of claim 11, wherein the battery includes a lithium ion secondary battery and said member containing lithium includes a cathodic active material composed of $LiCoO_2$ or $LiNiO_2$.

* * * * *